(No Model.)
E. B. MEYROWITZ.
EYEGLASS NOSE GUARD.
No. 572,307. Patented Dec. 1, 1896.
Fig. 1.
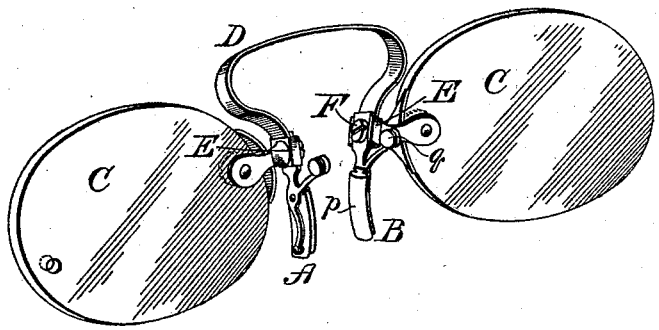
Fig. 2.  Fig. 3.
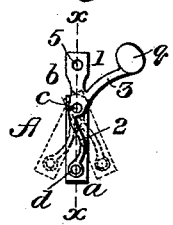 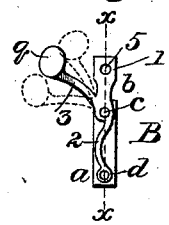
Fig. 4.  Fig. 5.
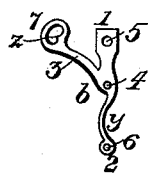 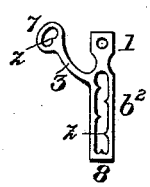
Witnesses
Simon Messer
Geo. M. Whitney.
Inventor
Emil B. Meyrowitz
by ____
Attorney

UNITED STATES PATENT OFFICE.

EMIL B. MEYROWITZ, OF RIDGEFIELD, NEW JERSEY, ASSIGNOR TO THE MEYROWITZ MANUFACTURING COMPANY, OF SAME PLACE.

EYEGLASS NOSE-GUARD.

SPECIFICATION forming part of Letters Patent No. 572,307, dated December 1, 1896.

Application filed February 14, 1896. Serial No. 579,194. (No model.)

*To all whom it may concern:*

Be it known that I, EMIL B. MEYROWITZ, a citizen of the United States of America, and a resident of Ridgefield, in the State of New Jersey, have invented a new and useful Improvement in Eyeglass Nose-Guards, of which the following is a specification.

This invention relates to those nose-guards for eyeglasses in which nose pieces or pads are movable edgewise upon pivots and to those nose-guards in which supplemental pads are provided to grasp the nose between the eyes.

The present invention consists, primarily, in novel means for adjusting nose pieces or pads edgewise by the optician's pliers or a small bending key or wrench. The pliable part is an adjusting-arm pliable between a pair of rivets, one of which is the pivot or center of movement.

The invention further consists in a specific nose-guard embodying the above principle, as hereinafter specified, and provided with a supplemental pad in a peculiar manner.

A sheet of drawings accompanies this specification as part thereof.

Figure 1 of the drawings is a perspective view of a pair of eyeglasses having improved nose-guards. Figs. 2 and 3 are back views of the pair of nose-guards detached, with dotted outlines of parts in different positions. Fig. 4 is an elevation of one piece of one of the nose-guards as it appears before being attached and before it is provided with a cork pad; and Fig. 5 is a view similar to Fig. 4, showing the metallic portion of a nose-guard adapted to have both pads of cork attached, as in Figs. 1 to 4.

Like letters and numbers refer to like parts in the several figures.

A pair A and B of the improved nose-guards are intended to be combined with a pair of eyeglass-lenses C and a spring or springs D of any kind by means of posts E common to all, as in Fig. 1, or in any known or improved manner.

Each of the nose-guards comprises two main parts *a b*, which are respectively a nose-piece and a metallic connection, and are united with each other by rivets *c* and *d*, said rivet *c* forming a pivot at the center of movement, around which the movable part turns edgewise in the act of adjusting it.

In a nose-guard of the specific construction represented in Figs. 1 to 4, inclusive, the nose-piece *a* is composed of an oblong metallic body, the lateral edges of which are turned in to form pad-holding lips, and a cork pad *p*, Fig. 1, clamped between said lips, and the specific metallic connection *b* is of the shape shown in Fig. 4 and comprises an attaching-arm 1, an adjusting-arm 2, and a third arm 3. Said adjusting-arm is relatively narrow and thin as compared with said attaching-arm, so as to be pliable edgewise, and extends between said rivets *c* and *d* as means for adjusting the nose-piece *a* upon said rivet *c* relatively to the plane of the lenses. This adjustment is illustrated by dotted lines in Fig. 2, where the plane of the lenses in its relation to the nose-guard A is represented by a broken line *x x*, and is readily and quickly effected by bending said adjusting-arm 2 edgewise by means of the pliers or by a small key or wrench. To permit this operation, the arm must have an effective length greater than the distance between the rivets *c* and *d*, and this is preferably provided for by making the arm with a suitable curve equivalent to an edgewise bend, as represented at *y* in Fig. 4. At the intersection of the arms 1 and 2 the metallic connection is provided with a hole 4, Fig. 4, to receive said pivotal rivet *c*. The arm 1 is provided with a hole 5 to receive an attaching-screw F, Fig. 1, in customary manner, and the extremity of the adjusting-arm 2 is provided with a hole 6, Fig. 4, to receive said rivet *d*. Said third arm 3 carries at its extremity a supplemental pad *q*, so that the pair of nose-guards will grasp the nose between the eyes as well as along its sides, and the arm is preferably pliable edgewise, as represented by dotted lines in Fig. 3, where a line *x x* represents the plane of the lenses in its relation to the nose-guard B.

As illustrated by Figs. 2 and 3, either of the two adjustments above described may be made separately. If the main pad *p* alone requires adjustment, as in Fig. 2, the arm 3 is grasped, together with the arm 1, by the stationary pliers while the arm 2 is being bent, and if the supplemental pad $q$ alone requires adjustment the nose-piece A is held by the stationary pliers while the arm 3 is being bent. Either or both adjustments may be quickly made by any optician by means of the ordinary adjusting-pliers, or a small key or wrench may be used for manipulating the arms 2 and 3, as above indicated.

At its extremity the arm 3 is provided with a loop 7, compressible edgewise, and with a sharp spur $z$ in the plane of the loop projecting within said loop, so as to partially penetrate and resist the escape of a piece of cork clamped within said loop to form said supplemental pad $q$ and protruding at both faces of the loop, as shown in Fig. 1. A main pad, of cork, may be held in like manner, as illustrated by Fig. 5, where the metallic frame-piece $b^2$ of the nose-guard is shown with a loop 8, provided with several inwardly-projecting spurs $z$ to embrace a main pad of cork.

The pad-holding loop 7 may have more than one spur to assist in holding the supplemental cork pad $q$. "Pads" of horn or other materials may of course be used in place of cork pads in connection with my peculiar adjusting-arm above described. The latter may be incorporated in other nose-guards to which it is applicable, and other like modifications will suggest themselves to those skilled in the art.

Having thus described the said improvement, I claim as my invention and desire to patent under this specification—

1. An eyeglass nose-guard comprising two parts united with each other by rivets one of which forms a pivot, one of the parts having an adjusting-arm which is pliable edgewise between said rivets to adjust the nose-guard, and is of greater effective length than the distance between said rivets to permit such adjustment.

2. An eyeglass nose-guard composed of a pivoted nose-piece adjustable edgewise and a metallic connection having an attaching-arm a pliable adjusting-arm and a third arm, in one piece, a supplemental pad supported at the extremity of said third arm, and a pair of rivets uniting the parts, substantially as hereinbefore specified.

EMIL B. MEYROWITZ.

Witnesses:
J. J. SCHUCK,
JEAN SCHMIDT.